(12) United States Patent
Kawazu

(10) Patent No.: US 7,868,933 B2
(45) Date of Patent: Jan. 11, 2011

(54) IMAGING DEVICE

(75) Inventor: Keiichi Kawazu, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 700 days.

(21) Appl. No.: 11/659,823

(22) PCT Filed: Jul. 22, 2005

(86) PCT No.: PCT/JP2005/013491

§ 371 (c)(1),
(2), (4) Date: Feb. 9, 2007

(87) PCT Pub. No.: WO2006/016471

PCT Pub. Date: Feb. 16, 2006

(65) Prior Publication Data

US 2008/0152187 A1   Jun. 26, 2008

(30) Foreign Application Priority Data

Aug. 13, 2004 (JP) .............................. 2004-235987

(51) Int. Cl.
*H04N 5/225* (2006.01)
(52) U.S. Cl. .................. 348/239; 348/207.99
(58) Field of Classification Search ............ 348/207.99, 348/207.1, 239
See application file for complete search history.

(56) References Cited

U.S. PATENT DOCUMENTS

2002/0001395 A1* 1/2002 Davis et al. ................. 382/100
2005/0248668 A1* 11/2005 Machida .................... 348/239

FOREIGN PATENT DOCUMENTS

| JP | 11-308564 | 11/1999 |
|---|---|---|
| JP | 2001-078014 | 3/2001 |
| JP | 2002-101322 | 4/2002 |
| JP | 2002-215029 | 7/2002 |

\* cited by examiner

*Primary Examiner*—Tuan Ho
(74) *Attorney, Agent, or Firm*—Finnegan, Henderson, Farabow, Garrett & Dunner, L.L.P.

(57) ABSTRACT

In an image capturing device structured of a camera module and a main body unit, information which can verify the authenticity of image data is superposed on the image data, and thereby the image capturing device is proposed in which the authenticity of the image data can be assured. Second control means (being a main control section) outputs first information which includes original verifying information to verify the authenticity of the image data, and first control means (being a sub-control section) superposes outputted first information and second information which the camera module has, onto the image data as an electrical watermark.

16 Claims, 5 Drawing Sheets

IMAGING DEVICE

TECHNICAL FIELD

The present invention relates to an image capturing device incorporating a camera module which captures an image of a subject and outputs it as digital image data.

BACKGROUND ART

In recent years, image capturing devices, such as digital cameras, have rapidly become widely used, with the high functions as well as the shift to low prices. Further, a large number of these image capturing devices have been incorporated in portable information terminal devices, which are always been able to capture images very simply, and are highly valued and widely used. Along with the popularization of digital image data, the digital image data has been accepted for ID photograph or evidential photograph to be filed, and which have been used as a photograph with certification.

It is easily to make interpolations of the captured digital image data, due to its inherent characteristics. Further, it is also possible to change the digital image data, leaving almost no trace of working, comparing to a silver halide photograph. Accordingly, if the digital image data is wrongly interpolated and filed as an ID photograph or an evidential photograph, it is very difficult to judge whether it is the original image, which can result in much damage. Therefore, interpolation-proof technologies of the image data have been proposed using digital watermarking or PKI (public key infrastructure) (see Patent Documents 1 and 2). Further, services are available to verify the authenticity of digital data (being untampered state of digital data) using evidence issued by a third organization, such as Certificate Authority.

Further, the above image capturing devices can be broadly classified into a camera module to capture the image and output its image data, and an image capturing device main body (hereinafter referred to as a main unit) to record and display the outputted image data. By this classified structure, the camera module can be treated as a single module, and can generally be used independently from the other features of the connected main unit, which improves convenience in the manufacture of the image capturing devices.

[Patent Document 1] Unexamined Japanese Patent Application Publication No. 11-308,564

[Patent Document 2] Unexamined Japanese Patent Application Publication No. 2001-78,014

DISCLOSURE OF THE INVENTION

However, the above conventional art can not be applied to the image capturing device structured of the camera module and the main unit, because the image data is formed in the camera module. Further, since image capturing information for capturing the image may exist in both the camera module and the main unit, there is a possibility that the conventional art can not offer all the image capture information for capturing the image to a user.

MEANS TO SOLVE THE PROBLEMS

A problem of the present invention is, in the image capturing device structured of the camera module and the main unit, to superpose information which is able to verify the authenticity of the captured image data, onto the captured image data, and to provide the image capturing device which can maintain the authenticity of original image data. To resolve this problem, the present invention has the structures described below.

Structure 1

In an image capturing device including:

a camera module featuring an image capturing means and a first control means to process image data captured by the image capturing means; and a main unit, connected to the camera module through signal lines, featuring a second control means to process the image data outputted from the camera module;

the image capturing device is characterized in that the second control means outputs first information which includes original verifying information which verifies the authenticity of the image data to the first control means through electrical signal lines, and the first control means attaches both first information outputted from the second control means and second information obtained by the camera module, to the image data.

"Authenticity of the image data" means that the image data is the original one, and further includes the concept of "perfectibility" in which the image data has not been interpolated.

Structure 2

The image capturing device described in Structure 1, wherein the original verifying information is interpolation detecting information which detects the interpolation of the image data.

Structure 3

The image capturing device described in Structure 1, wherein the original verifying information is digital signature information which shows the author of the original image data.

Structure 4

The image capturing device described in Structure 1, wherein the original verifying information is time information which shows the precise time when the image data was captured.

Structure 5

The image capturing device described in any one of Structures 1-4, wherein the main unit further includes an obtaining means which obtains the original verifying information from a third organization.

"Third organization" means an organization such as a CA (Certificate Authority), which forms and offers original verifying information to certify the authenticity of various data such as image data, and further offers a service to verify the authenticity of data, based on the formed original verifying information.

Structure 6

The image capturing device described in any one of Structures 1-4, wherein the first control means superposes original verifying information, included in first information, onto signals of the image data as a digital watermark.

Structure 7

The image capturing device described in Structure 1, wherein first information includes image capturing information for capturing the image which is inherent in the main unit.

"Image capturing information" means image capturing conditions, such as time information to show a full date and precise time, exposure time, F-number, the manufacturer of the image capturing device and the device model name.

Structure 8

The image capturing device described in Structure 1, wherein second information includes image capturing information for capturing the image which is inherent in the camera.

Structure 9

The image capturing device described in Structure 7 or 8, wherein the first control means forms total image capture information for capturing the image by the image capturing means, based on image capturing information which is inherent in the main unit included in the first information, and also based on image capturing information for capturing the image which is inherent in the camera module included in the second information, and further the first control means superposes said total image capturing information onto the image data via a predetermined format.

Structure 10

The image capturing device described in Structure 1, wherein the main unit further includes an input means which can select and determine whether to include the original verifying information in the first information.

BRIEF DESCRIPTIONS OF THE DRAWINGS

Figure 1:
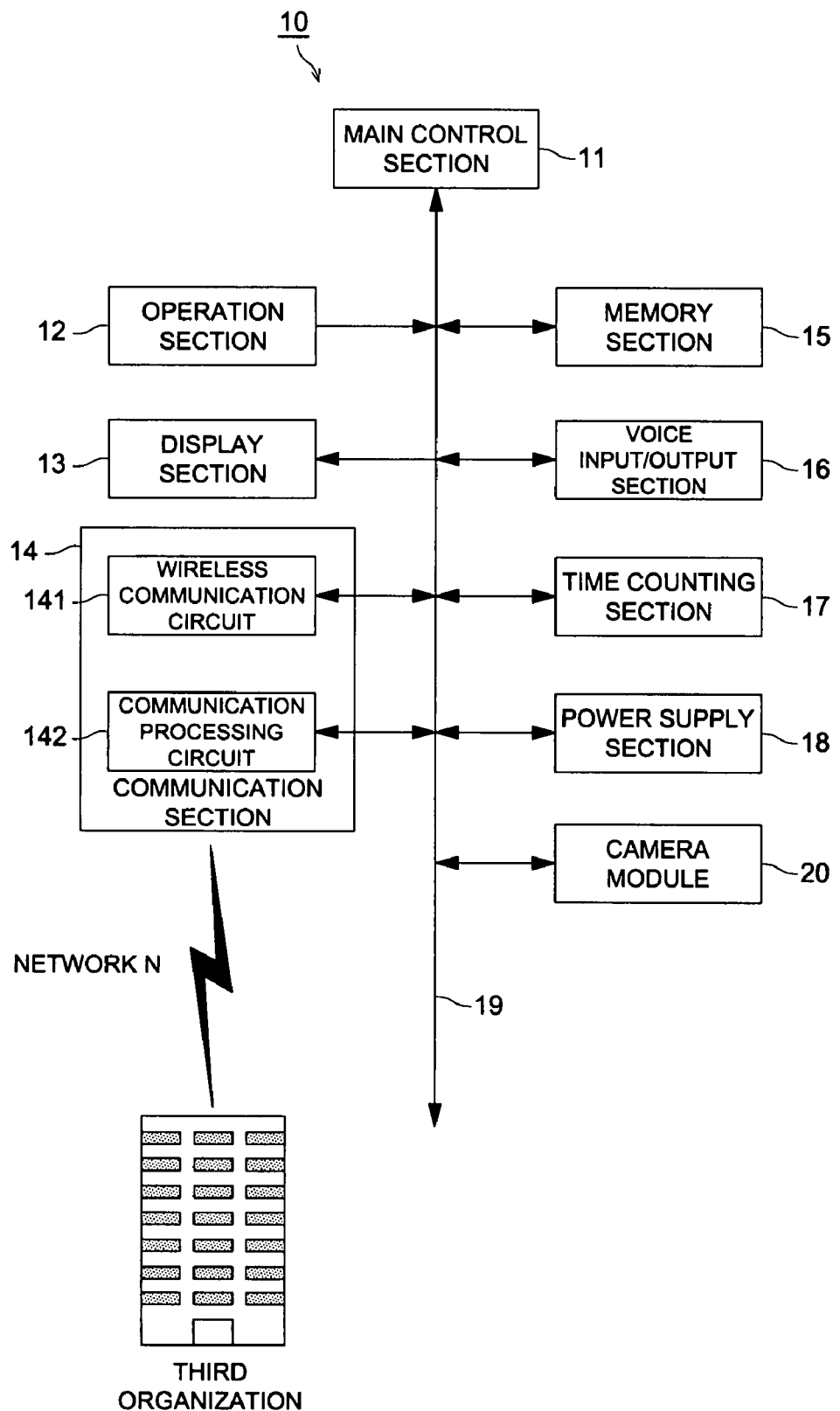
FIG. 1 is a block diagram showing the structure of a cellular phone.

EXPLANATION OF THE NUMERALS 10 cellular phone
11 main control section
12 operation section
13 display section
14 communication section
141 wireless communication circuit
142 communication processing circuit
15 memory section
16 voice input/output section
17 time counting section
18 power source section
19 bus
20 camera module (camera module)
201 image capturing optical system (image capturing means)
202 CCD (image capturing means)
203 A/D conversion circuit (image capturing means)
204 signal processing circuit (image capturing means)
205 image forming section (image capturing means)
206 image output interface
207 actuator
208 memory section
209 power supply circuit
210 sub-control section
211 serial communication interface

BEST MODE FOR CARRYING OUT THE INVENTION

The examples of cellular phone 10, incorporating a camera module as an image capturing device, in which the image capturing device of the present invention is used, will be detailed while referring to FIGS. 1-5.

FIG. 1 shows a functional structure of cellular phone 10. Cellular phone 10 is structured of main control section 11, operation section 12, display section 13, communication section 14, memory section 15, voice input/output section 16, time counting section 17, power source section 18 and camera module 20, and each section is connected via bus 19. Camera module 20 represents a camera module described in the scope of claims, and cellular phone 10, excluding camera module 20, represents a main unit described in the scope of claims (hereinafter "cellular phone 10 excluding camera module 20" is referred to as "main unit").

Main control section 11 includes a CPU (Central Processing Unit), an internal RAM (Random Access Memory), and a ROM (Read Only Memory), all of which are not illustrated. Main control section 11 sends control signals to each section, to control the total operation of cellular phone 10 based on various control programs stored in the ROM, in a predetermined area in the internal RAM as the working area.

Main control section 11 reads out the various process programs and application programs, such as mail soft ware, stored in memory section 15, develops them on a work memory, conducts various processes, stores the processed results in the work memory in the RAM, and displays the processed results on display section 13. Further, main control section 11 stores the processed results, stored in the work memory, in a predetermined storing area in memory section 15.

Main control section 11 obtains original verifying information from a third organization via communication section 14, and outputs it on camera module 20 via serial communication interface 211. Further, main control section 11 obtains time information counted by time counting section 17 and information inherent in the main unit, and outputs them as original verifying information on camera module 20 via serial communication interface 211.

Main control section 11 obtains image capturing information for capturing the image from each section in the main unit, and outputs this information, which is inherent in the main unit on camera module 20, via serial communication interface 211. "Image capturing information" represents information of image capturing conditions and the image capturing environment, for capturing the image. For example, image capturing information includes time information from time counting section 17, exposure time, F-value, shutter speed, manufacturer of the image capturing device, and the device model name.

Since the image capturing device is structured of camera module 20 and of the main unit, as in the present example, image capturing information exists independently. Accordingly, sub-control section 210, which is to be explained later, integrates both types of image capturing information as total image capturing information. This total image capturing information is superposed onto the image data in accordance with Exif (being Exchangeable Image File Format).

Main control section 11 stores Exif image data, which is outputted from camera module 20, in memory section 15. Further, main control section 11 displays Exif image data, which is stored in memory section 15, on display section 13.

Operation section 12 is structured of various keys, such as numerical keys, alphabetical keys and function keys, and small stick-shaped pointing devices, all of which are used for the operation and the instruction of cellular phone 10. Operation section 12 outputs signals generated by key operation on main control section 11.

Display section 13 is structured of an LCD (Liquid Crystal Display) panel, which displays the image based on the display data inputted from control section 11.

Communication section 14 is structured of wireless communication circuit 141 and communication processing circuit 142, which sends and receives the voice signals via the predetermined wireless communication method. Specifically, communication section 14 obtains original verifying information from the third organization which is connected via network N.

The third organization connected to communication section 14 is an organization such as Certificate Authority, which issues original verifying information to certify the authenticity of the various data, such as the image data, and provides original verifying information to the terminals such as cellular phone 10 connected via network N. Further, the third organization provides the service which is able to verify the authenticity of the data based on the generated original verifying information.

Original verifying information verifies the authenticity of the image data, which is structured of digital signature information which shows an author of a digital identification or a certificate, interpolation detecting information which can detect alteration of the image data, such as a hash value obtained by message digest technology, and time information which shows full date and precise time when the image data was generated.

Among the above original verifying information, digital signature information can verify whether the author of the image data is valid, interpolation detecting information can verify whether the image data has been altered, and time information can give proof that the image data existed at that specific time.

Based on analog signals from communication processing circuit 142, which will be detailed later, wireless communication circuit 141 sends data communication and telephone records by wireless communication between a base transceiver station of a communication service company, which is not illustrated, and a communication antenna of cellular phone 10, which is also not illustrated, via various cellular phones, the standards of the wireless modems and communication methods, such as GSM (being Global System of Mobile communication), GPRS (being General Packet Radio System), PDC (being Personal Digital Cellular), CDMA (being Code Division Multiple Access), PHS (being Personal Handyphone System), Bluetooth wireless communication system and wireless LANs (being Local Area Network), and further wireless communication circuit 141 outputs the received analog signals to communication processing circuit 142.

Communication processing circuit 142, structured of AFE (being Analog Front End) and communication DSP (being Digital Signal Processor), both of which are not illustrated, converts the analog signals inputted from wireless communication circuit 141 to the various types of digital signals, such as communication data, image data and voice data, and outputs these data to main control section 11. Further, communication processing circuit 142 compresses the above various digital data inputted from main control section 11, and converts them to analog signals, to output them to wireless communication circuit 141.

Memory section 15 is structured of a volatile memory, a magnetic or optical recording medium, or a non-volatile memory, to store the various data such as operating programs.

Voice input-output section 16 is structured of a voice speaker and a microphone, which outputs the user's voice to main control section 11 as voice input signals via a microphone, and also outputs the voice output signal from main control section 11 by the speaker as an audible voice.

Time counting section 17 records the present time and the date, and outputs them as time information to main control section 11. Time counting section 17 is structured of an oscillating circuit (which is not illustrated) which generates electrical signals with a predetermined frequency, and of a dividing circuit which obtains the signals with the predetermined frequency, by dividing the signals which enter from the oscillating circuit, and time counting section 17 processes the obtained signals to determine the precise present time.

Power supply source section 18, structured of a power circuit or a charging battery, supplies the electrical power to each section of cellular phone 10, based on control of main control section 11.

Figure 2:
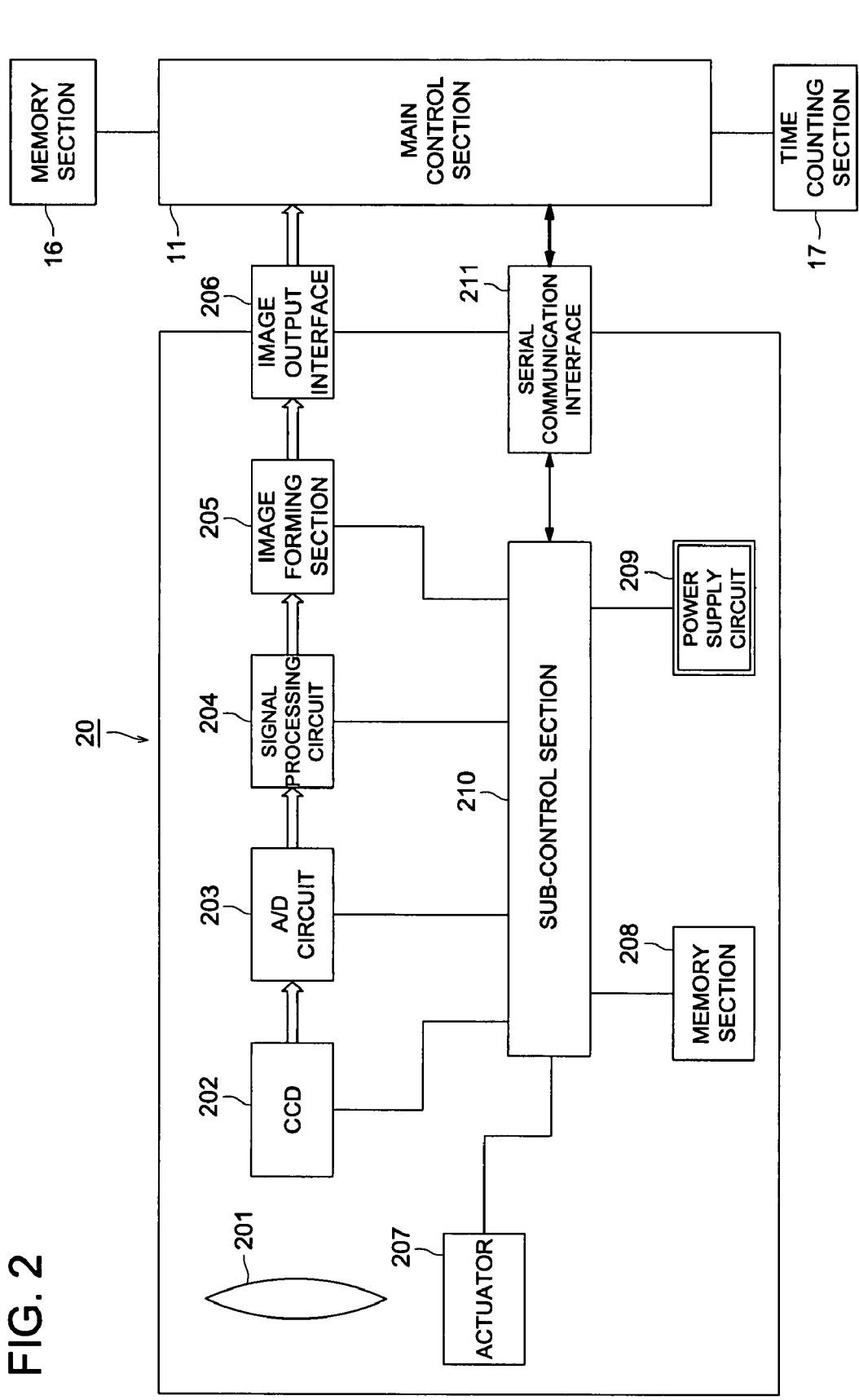
FIG. 2 is a block diagram showing the structure of the camera module.

Camera module 20 is structured of image capturing optical system 201, CCD (being Charge Coupled Devices) 202, A/D (Analog-Digital) conversion circuit 203, signal processing circuit 204, image forming section 205, image output interface 206, actuator 207, memory section 208, power supply circuit 209, sub-control section 210 and serial communication interface 211, as shown in FIG. 2.

Image capturing optical system 201, having a focusing lens (which is not illustrated), focuses the optical image of the subject to form the image of the subject.

CCD 202 converts the image of the subject, which is formed by image capturing optical system 201 on a light receiving surface, to an electrical signal, and outputs it to A/D circuit 203 as the analog image data. In the present embodiment, a CCD is used, but which is not limited, a solid image capturing element, such as a CMOS (being complementary metal oxide semiconductor) can be used.

A/D conversion circuit 203 converts the analog image data outputted from CCD 202 to digital image data, and outputs it to signal processing circuit 204.

Signal processing circuit 204 conducts YUV data conversion, gamma correction and white balance correction to the image data outputted from A/D circuit 203, and outputs the processed data to image forming section 205. Further, signal processing circuit 204 superposes original verifying information onto the image data as a digital watermark.

Image forming section 205 conducts the compression process to the image data outputted from signal processing circuit 204 by the compression method based on JPEG (being Joint Photographic Expert Group) method, and outputs the JPEG image data to image output interface 206. Further, being controlled by sub-control section 210, image forming section 205 forms Exif image data through attaching image capturing information to a header section of the JPEG image data by the format compliant with the Exif standard, and outputs the Exif image data to image output interface 206.

In addition, the image data is formed, in the present embodiment, to be compliant with the JPEG method, but the image data can also be compliant with other formats, such as TIFF (being Tag Image File Format). Further, in the present invention, image capturing information is superposed to a header section to be compliant with the Exif standard, but other standards can also be used.

Image output interface 206, which is an interface, outputs the image data outputted from A/D circuit 203 to main control section 11, and is connected to main control section 11 by a high speed one-way bus.

Actuator 207 includes a focusing motor which is not illustrated, and a focus driver, which drives the focusing motor based on control signals inputted from sub-control section 210, and drives the focus lens of image capturing section 201 in the optical axial direction. Actuator 207 opens or closes a lens shutter, which is not illustrated, of image capturing optical system 201.

Memory section 208 is structured of a nonvolatile memory, such as flash memory, to store program codes to control each section of camera module 20, as well as to store adjustment information of the various control parameters.

Adjustment information includes adjustment values inherent in each functional section in camera module 20, for example, information to set infinity, hyperfocal, and macropositions of image capturing optical system 201, and information to correct color variation of CCD 202. When camera module 20 is activated, each section is initialized based on adjustment information.

Power supply circuit 209 regulates the voltage which is supplied from power source section 18 in FIG. 1, and supplies electrical power to each functional section of camera module 20, based on the control of sub-control section 210.

Sub-control section 210 includes a CPU, an internal RAM and a ROM, none of which are illustrated. The CPU sends control signals to completely control the operation of each section of camera module 20, based on the various control signals stored in the ROM, in the working area which is predetermined in the internal RAM. Sub-control section 210 totally controls the operations of each section of camera module 20, based on the control signals inputted from main control section 11 via serial communication interface 211.

Sub-control section 210 controls signal processing circuit 204 to superpose original verifying information, which is inputted from the main unit, as a digital watermark, onto the digital image data outputted from an A/D circuit, obtained during the image capture. Original verifying information, which is superposed on the image data as a digital watermark, is verified by the third organization connected through communication section 14, or by well-known certificating technology, and thereby, the image data is judged whether it is authentic. Original verifying information can be superposed on a sampled value of the image data, or on a specific frequency component after the image data is converted to frequency components. Further, after original verifying information is encrypted by camera module 20, the encrypted original verifying information can be superposed as digital watermark on the digital image data.

When camera module 20 is started, sub-control section 210 initializes each section of camera module 20, based on adjustment information stored in memory section 208, and on image capturing information which is inputted from the main unit, and is inherent in the main unit.

Sub-control section 210 obtains image capturing information for capturing the image from each section of camera module 20. Image capturing information inherent in camera module 20, and image capturing information inherent in the main unit, are superposed on the header section of JPEG image data generated in image forming section 205, as total image capturing information.

Serial communication interface 211 connects sub-control section 210 to main control section 11, and outputs the control signals, which are inputted from main control section 11, to sub-control section 210, and also outputs the various signals, which are inputted from sub-control section 210, to main control section 11.

Next, the operations of present cellular phone 10 will be detailed, while dividing the operations into embodiments 1 to 3. In addition, as the operation of the present embodiments, it is assumed that original verifying information is obtained from the third organization via communication section 14, and that the user can set whether said original verifying information is used or not, at arbitrary timing via operation section 12.

EMBODIMENT 1

Figure 3:
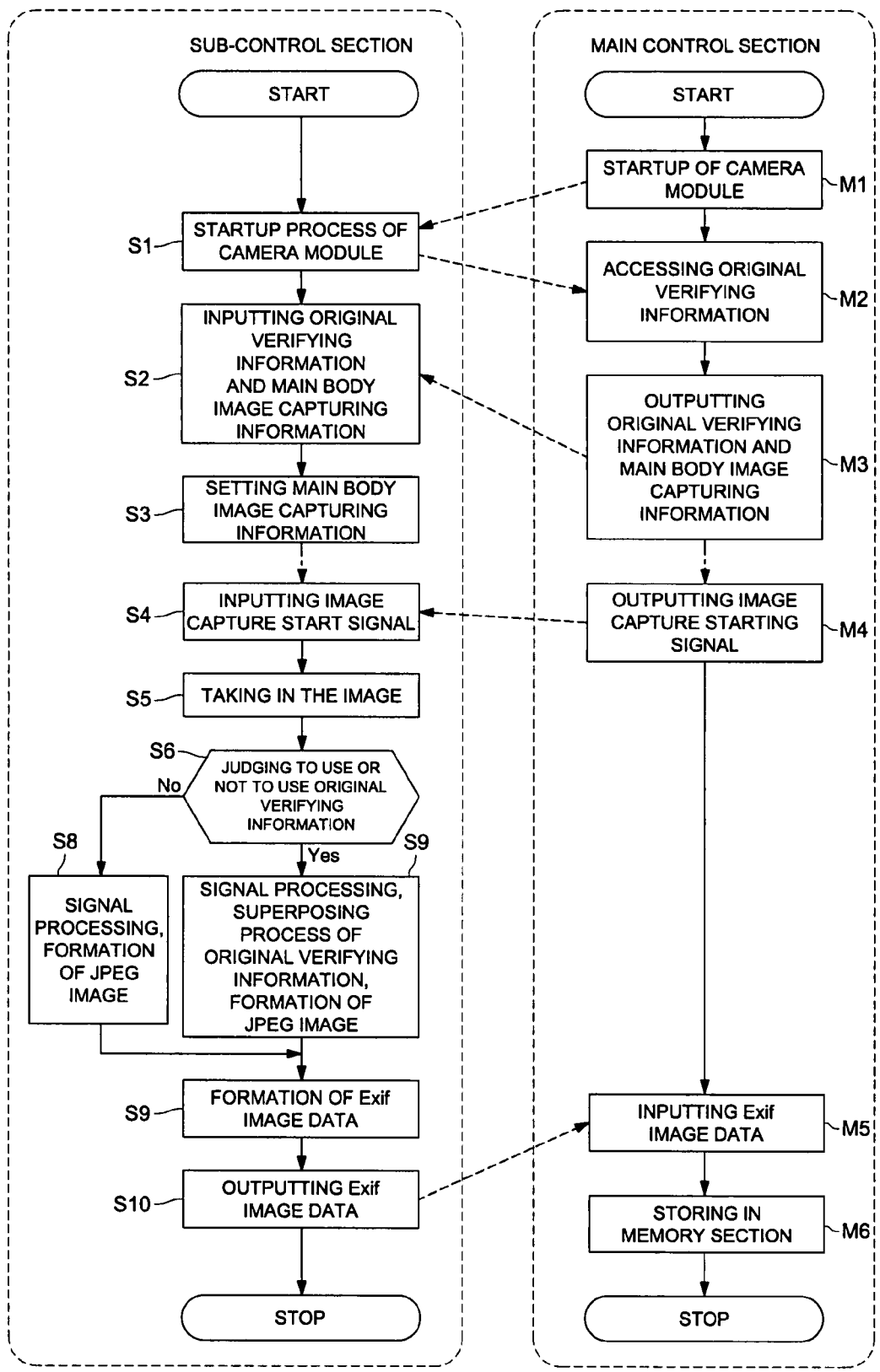
FIG. 3 is a flow chart showing the image capturing process in Embodiment 1.

Cellular phone 10 of embodiment 1 will now be detailed while referring to FIG. 3. In embodiment 1, when camera module 20 starts the operation, original verifying information is outputted from main control section 11 to camera module 20. Steps M1-M6 are controlled by main control section 11, while steps S1-S10 are controlled by sub-control section 210.

When the user switches on camera module 20, main control section 11 outputs a signal to sub-control section 210 of camera module 20, to instruct the start of operation of camera module 20 via serial communication interface 211 (being step M1).

When the operation start signal outputted in step M1 is transmitted to camera module 20, each functional section in camera module 20 starts based on setting information stored in memory section 208 (being step S1), and after startup process is completed, a signal showing the completion of the startup is outputted to main control section 11 via serial communication interface 211.

After the signal indicating the completion of the startup is inputted to main control section 11 from camera module 20, communication section 14 is connected to the third organization via network N, to obtain original verifying information (being step M2).

Next, original verifying information which is obtained in step M2, and image capturing information which is inherent in the main unit (hereinafter referred to as main unit image capturing information) are outputted to sub-control section 210 via serial communication interface 211 (being step M3).

Original verifying information and main unit image capturing information outputted in step M3 are transmitted to camera module 20 (being step S2), and both types of information are stored in memory section 208, and main unit image capturing information is set in each functional section in camera module 20 (being step S3).

When the user presses an image capture starting button through operation section 12, then the signal to instruct the start of image capturing is transmitted from main control section 11 to sub-control section 210 via serial communication interface 211 (being step M4).

The signal to instruct the start of image capturing, which was outputted in step M4, is transmitted to sub-control section 210 (being step S4), then the analog image data, captured by CCD 202 through image capture optical system 201, is converted to digital image data by A/D circuit 203 (being step S5).

Whether or not to use original verifying information, which was previously set by the user, is checked for (being step S6), and if it has been chosen (Yes in step S6), after signal processing circuit 204 conducts a predetermined signal process to the digital image data which was outputted in step S5, original verifying information, which was stored in memory section 208, is superposed on the digital image data as a digital watermark, to be formed as JPEG image data by image forming section 205 (being step S7), and the procedure advances to step S9.

On the other hand, if original verifying information was not chosen (No in step S6) by the user, after signal processing circuit 204 conducts a predetermined signal process to the digital image data which was outputted in step S5, the processed digital image data is formed as JPEG image data by image forming section 205 (being step S8), and the procedure advances to step S9.

Image capturing information which is inherent in camera module 20, and main unit image capturing information which was stored in memory section 208, are superposed to the header section of JPEG image data formed in step 7 or step 8, to be compliant with the Exif standard, and they are formed as Exif image data (being step S9). This Exif data is outputted to main control section 11 via image output interface 206 (being step S10), and the process in camera module 20 is terminated.

After the Exif data outputted from camera module 20 is inputted to the main unit (being step M5), the Exif data is stored in memory section 15 (being step M6), whereby the process in the main unit is completed.

That is, in embodiment 1, since it is possible to verify the authenticity of the image data, based on original verifying information which is superposed on the image data, the authenticity of the image data can be assured.

Further, when camera module 20 starts up, original verifying information is outputted to camera module 20. That is, it is not necessary to obtain original verifying information at each image capturing operation, therefore, the process from the image capture to the formation of Exif image data can be more rapidly achieved.

Yet further, when plural image data are captured, original verifying information which was obtained when camera module 20 started up can be commonly used for each image data. Accordingly, the present embodiment is very suitable to capture successive subjects.

EMBODIMENT 2

Figure 4:
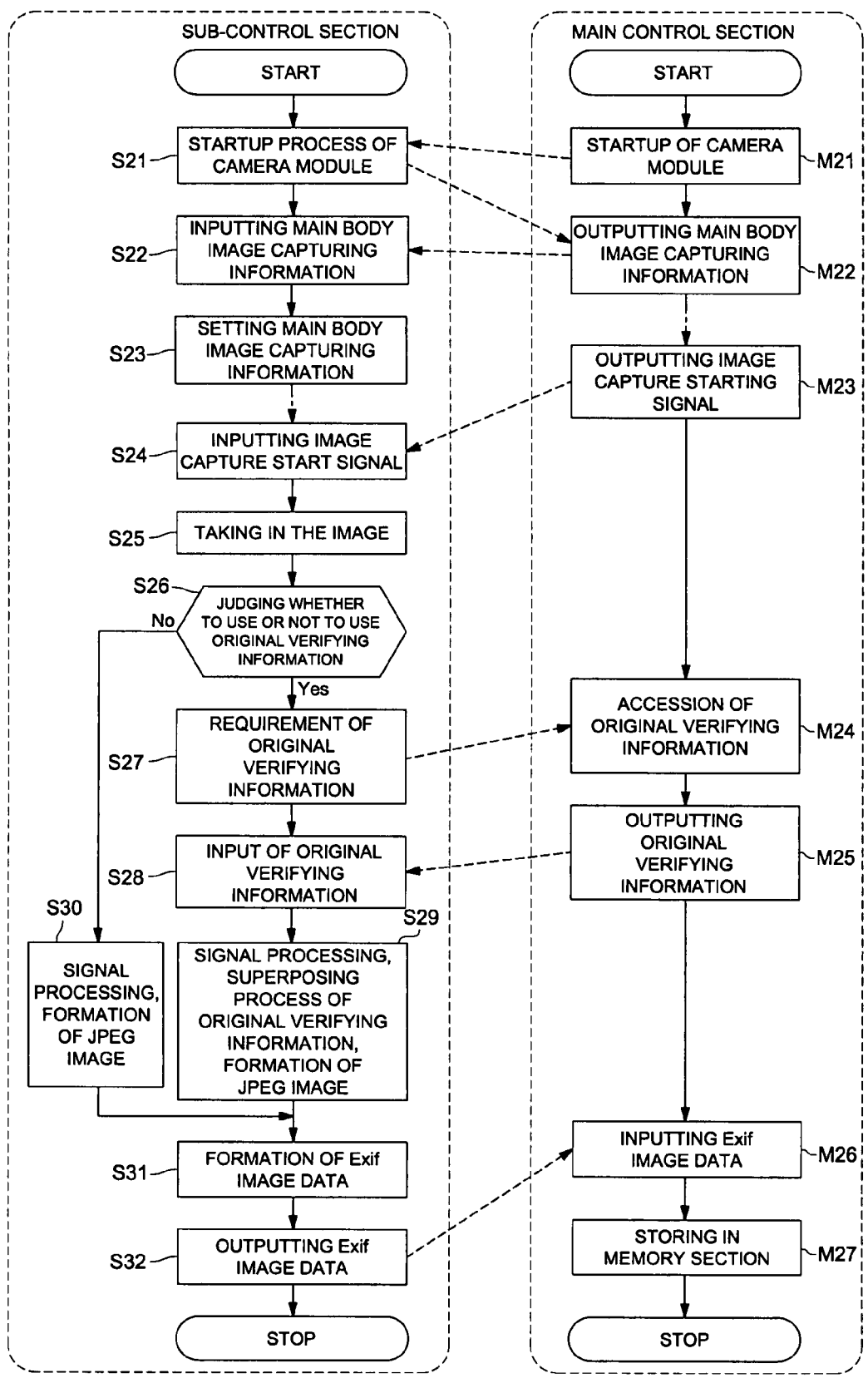
FIG. 4 is a flow chart showing the image capturing process in Embodiment 2.

Cellular phone 10 of embodiment 2 will now be detailed while referring to FIG. 4. In embodiment 2, after camera module 20 captures the image, camera module 20 requests original verifying information to the main unit. Steps M21-M27 are controlled by main control section 11, while steps S21-S32 are controlled by sub-control section 210.

When the user switches on camera module 20, main control section 11 outputs a signal to instruct the start of operation of camera module 20 to sub-control section 210 of camera module 20, via serial communication interface 211 (being step M21).

When the operation start signal outputted in step M21 is transmitted to camera module 20, each functional section in camera module 20 starts up, based on setting information stored in memory section 208 (being step S21), and after startup process is completed, the signal indicating the completion of the startup, is outputted to main control section 11 via serial communication interface 211.

After the startup completion signal is inputted to main control section 11 from camera module 20, main unit image capturing information is outputted to sub-control section 210 via serial communication interface 211 (being step M22).

Main unit image capturing information outputted in step M22 enters camera module 20 (being step S22), to be stored in memory section 208, and is set in each functional section in camera module 20 (being step S23).

When the user presses an image capture starting button through operation section 12, then signals to instruct the start of image capturing are outputted from main control section 11 to sub-control section 210 via serial communication interface 211 (being step M23).

When the signal to instruct the start of image capturing, which was outputted in step M23, is transmitted to sub-control section 210 (being step S24), then the analog image data, captured by CCD 202 through image capture optical system 201, is converted to digital image data by A/D circuit 203 (being step S25).

Whether or not to use original verifying information, which was previously set by the user, is checked for (being step S26), and if it has been chosen by the user (Yes in step S26), a signal to request original verifying information is outputted to main control section 11 through serial communication interface 211 (being step S27).

When the signal to request original verifying information, outputted in step S27, enters main control section 11, original verifying information is obtained from the third organization through communication section 14 (being step M24), and said original verifying information is outputted to sub-control section 210 through serial communication interface 211 (being step M25).

After original verifying information, outputted in step M26, is transmitted to sub-control section 210 (being step S28), it is stored in memory section 208. After signal processing circuit 204 conducts a predetermined signal process to the digital image data which was outputted in step S25, original verifying information is superposed on the digital image data as a digital watermark, to be formed as JPEG image data by image forming section 205 (being step S29), and the procedure advances to step S31.

On the other hand, if original verifying information has not been chosen (No in step S26), after signal processing circuit 204 conducts a predetermined signal process to the digital image data which was outputted in step S25, the processed digital image data is formed as JPEG image data by image forming section 205 (being step S30), and the procedure advances to step S31.

Image capturing information which is inherent in camera module 20, and main unit image capturing information which was stored in memory section 208, are superposed to the header section of JPEG image data formed in step 29 or step 30, which are in compliant with Exif standards, and are formed as Exif image data (being step S31). This Exif data is outputted to main control section 11 via image output interface 206 (being step S32), and the process in camera module 20 is completed.

After the Exif data outputted from camera module 20 is transmitted to the main unit (being step M26), the Exif data is stored in memory section 15 (being step M27), and the process in the main unit is completed.

That is, in embodiment 2, since it is possible to verify the authenticity of the image data, based on original verifying information which was superposed on the image data, the authenticity of the image data can be assured.

Further, main control section 11 obtains original verifying information, based on the request which is outputted from camera module 20 after the image capturing operation, and outputs original verifying information to camera module 20.

Accordingly, it is possible to use original verifying information which is different in each captured image.

EMBODIMENT 3

Figure 5:
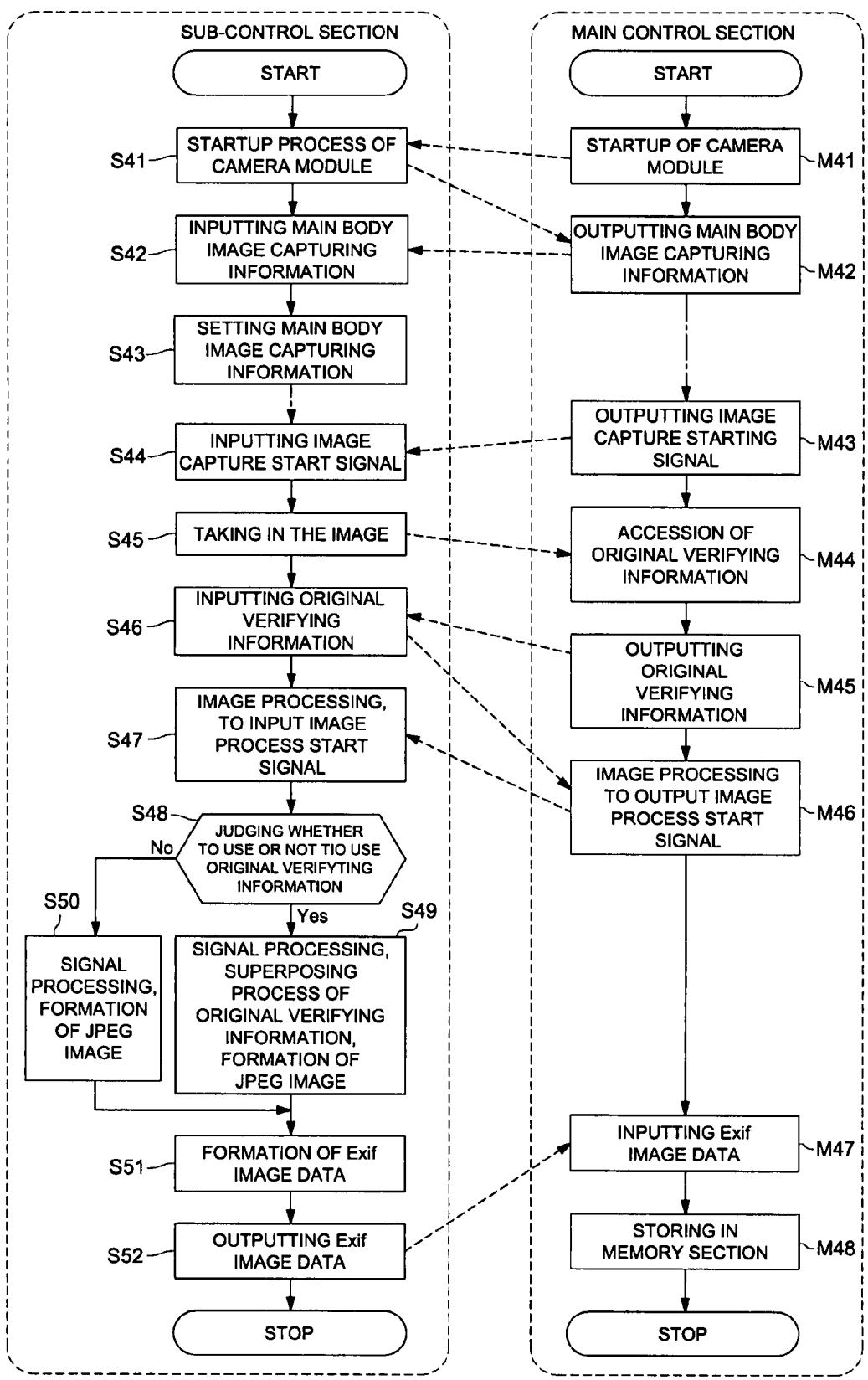
FIG. 5 is a flow chart showing the image capturing process in Embodiment 3.

Cellular phone 10 of embodiment 3 will now be detailed while referring to FIG. 5. In embodiment 3, an example is shown in which after the image is captured by camera module 20, original verifying information is requested to the main unit from camera module 20. Steps M41-M48 are controlled by main control section 11, while steps S41-S52 are controlled by sub-control section 210.

When the user switches on camera module 20, main control section 11 outputs a signal to instruct the start of operation of camera module 20 to sub-control section 210 of camera module 20, via serial communication interface 211 (being step M41).

When the operation start signal outputted in step M41 is transmitted to camera module 20, each functional section in camera module 20 starts up, based on setting information stored in memory section 208 (being step S41), and after the startup process is completed, signal showing the completion of the startup is outputted to main control section 11 via serial communication interface 211.

After the startup completion signal is inputted to main control section 11 from camera module 20, main unit image capturing information is outputted to sub-control section 210 via serial communication interface 211 (being step M42).

Main unit image capturing information outputted in step M42 is transmitted to camera module 20 (being step S42), to be stored in memory section 208, and main unit image capturing information is set in each functional section in camera module 20 (being step S43).

When the user presses the image capture starting button, through operation section 12, signal to instruct the start of image capturing is outputted from main control section 11 to sub-control section 210 via serial communication interface 211 (being step M43).

The signal to instruct the start of image capturing, which was outputted in step M43, is transmitted to sub-control section 210 (being step S44), and then the analog image data, captured by CCD 202 through image capture optical system 201, is converted into digital image data by A/D circuit 203 (being step S45). A signal to indicate the completion of the image capture is outputted to main control section 11 via serial communication interface 211.

When the signal to indicate the completion of the image capture is transmitted to main control section 11, original verifying information is obtained from the third organization through communication section 14 (being step M44), and original verifying information is outputted to sub-control section 210 through serial communication interface 211 (being step M45).

After original verifying information outputted in step M45 is transmitted to sub-control section 210 (being step S46), original verifying information is stored in memory section 208. Signal, indicating that original verifying information has been stored, is outputted to main control section 11 via serial communication interface 211.

After the above signal is inputted to main control section 11, image process starting signal is outputted to sub-control section 210 via serial communication interface 211 (being step M46).

After the image process starting signal, outputted in step M46, is transmitted to sub-control section 210 (being step S47), whether or not to use original verifying information, which was previously set by the user, is checked for (being step S48). If it has been chosen (being Yes in step S48), after signal processing circuit 204 conducts a predetermined signal process on the digital image data which was outputted in step S45, original verifying information, which was stored in memory section 208, is superposed on the digital image data as a digital watermark, to be formed as JPEG image data by image forming section 205 (being step S49), and the procedure advances to step S51.

On the other hand, if original verifying information has not been chosen (No in step S48), after signal processing circuit 204 conducts a predetermined signal process to the digital image data which was outputted in step S45, the processed digital image data is formed as JPEG image data by image forming section 205 (being step S50), and the procedure advances to step S51.

Image capturing information which is inherent in camera module 20, and main unit image capturing information which was stored in memory section 208, are superposed onto the header section of JPEG image data formed in step 49 or step 50, to be compliant with the Exif standard, then they are formed as Exif image data (being step S51). This Exif data is outputted to main control section 11 via image output interface 206 (being step S52), and the process in camera module 20 is completed.

After the Exif data outputted from camera module 20 is inputted to the main unit (being step M47), the Exif data is stored in memory section 15 (being step M48), and the process in the main unit is completed.

That is, in embodiment 3, since it is possible to verify the authenticity of the image data, based on original verifying information which was superposed onto the image data, the originality of the image data can be assured.

Further, original verifying information is outputted to camera module 20 for each image capture conducted by camera module 20, and above outputted original verifying information is superposed onto the header section of the image data, based on the image process starting signal outputted from main control section. Accordingly, it is possible to use original verifying information which differs in each captured image, and the process to superpose original verifying information can be conducted based onto the image process starting signal.

The above descriptions in the present embodiments show examples of the image capturing device relating to the present invention, and descriptions are not limited to these examples. These detailed structures and operations of cellular phone 10 of the present embodiments can be appropriately changed within the scope of this invention as long as it does not deviate from the contents of the present invention.

In the present embodiments, original verifying information is obtained from the third organization via network N, but it is not limited to the third organization. For example, time information which is obtained by time counting section 17 provided in the main unit can be used as original verifying information, or also used can be discriminating information, such as a manufacturer's serial number of the main unit, can also be used.

Further, in the present embodiments, original verifying information is superposed onto the image data as a digital watermark, but to which the present embodiments is not limited. Other features can be used for superposing original verifying information. For example, after original verifying information is encrypted by well-known cryptographic technology, such as a public key cryptosystem, said encrypted original verifying information is superposed onto the image data as an inseparable feature.

Still further, in the present embodiments, original verifying information is superposed onto the image data, before the JPEG compression is processed. However, original verifying information can also be superposed onto the image data during or after JPEG compression, or after the Exif image data is formed.

Still further, in the present embodiments, image capturing information of both the main unit and camera module 20 are attached to the image data to be compliant with the Exif standard, but it is also possible for the present embodiments to be compliant with the other standards.

Concerning the availability of the present embodiments in the industry, based on the invention described in Structure 1, second control means outputs first information which includes original verifying information which verifies the originality of the image data to the first control means, and the first control means attaches both first information outputted from the second control means and second information obtained by the camera module, onto the image data. Due to this, the authenticity of the image data can be verified by original verifying information, and the authenticity of the image data can be assured.

Further, first and second information are superposed onto the image data. Therefore, total information can be superposed onto the image data even though such information exists separately in the main unit and the camera module.

Based on the invention described in Structure 2, original verifying information is interpolation detecting information which detects the any interpolation of the image data. Accordingly, the interpolation of the image data can be invariably detected based on original verifying information, and thereby the authenticity of the image data can be assured.

Based on the invention described in Structure 3, the original verifying information is digital signature information which checks an author of the image data. Accordingly the author can be checked based on original verifying information, and thereby the authenticity of the image data can be assured.

Based on the invention described in Structure 4, the original verifying information is time information which shows the specific time when the image data is captured. Accordingly, it can be certified that the image data existed at the time shown by original verifying information.

Based on the invention described in Structure 5, the main unit further includes an obtaining means which obtains the original verifying information from a third organization. Accordingly, the authenticity of the image data can be verified via the third organization, and thereby the authenticity of the image data can be assured.

Based on the invention described in Structure 6, the first control means superposes original verifying information, included in first information, onto signals of the image data as a digital watermark. Accordingly original verifying information included in first information can be superposed onto the image data in an inseparable form.

Based on the invention described in Structure 7, first information includes image capturing information inherent in the main unit for capturing the image by the image capturing means. Accordingly, image capturing information which is inherent in the main unit can be transmitted to the camera module.

Based on the invention described in Structure 8, second information includes image capturing information which is inherent in the camera module for the captured image by the image capturing means. Accordingly, image capturing information which is inherent in the camera module can be superposed onto the image data.

Based on the invention described in Structure 9, the first control means forms total image capture information for the captured image by the image capturing means, based on image capturing information which is inherent in the main unit included in the first information, and also based on image capturing information which is inherent in the camera module included in the second information, and further the first control means superposes said total image capturing information onto the image data via a predetermined format. Due to this, total image capturing information can be superposed onto the image data in the predetermined format. For example, total image capturing information can be superposed onto the image data to be compliant with Exif (being Exchangeable Image File Format) which is frequently used in the digital camera.

Based on the invention described in Structure 10, the main unit further includes an input means which can select and determine whether to include the original verifying information in the first information. Accordingly the user can select whether to output the image data to which original verifying information is superposed, via the input means, that is, the user can select whether to output the above image data, based on the image capturing conditions.

The invention claimed is:

1. An image capturing device comprising:
a camera module including:
an image capturing section to capture an image; and
a first control section to process image data captured by the image capturing section; and
a main unit connected to the camera module through electrical signal lines, including a second control section to process the image data outputted from the camera module;
wherein the second control section outputs first information which includes original verifying information which verifies the authenticity of the image data to the first control section through the electrical signal lines, and
wherein the camera module includes second information, and
wherein the first control section superposes both the first information outputted from the second control section and the second information obtained by the camera module, onto the image data, wherein the second information includes information for capturing the image which is inherent in the camera module.

2. The image capturing device of claim 1, wherein the original verifying information is interpolation detecting information which detects interpolation of the image data.

3. The image capturing device of claim 1, wherein the original verifying information is digital signature information which shows an author of the original image data.

4. The image capturing device of claim 1, wherein the original verifying information is time information which shows a precise time when the image data is captured.

5. The image capturing device of claim 1, wherein the main unit further includes an obtaining section which obtains the original verifying information from a third organization.

6. The image capturing device of claim 1, wherein the first control section superposes the original verifying information, included in the first information, onto signals of the image data as a digital watermark.

7. The image capturing device of claim 1, wherein the main unit further includes an input section which selects and determines whether to include the original verifying information in the first information.

8. An image capturing device comprising:
a camera module having second information, including:
  an image capturing section to capture an image; and
  a first control section to process image data captured by the image capturing section; and
a main unit connected to the camera module through electrical signal lines, including a second control section to process the image data outputted from the camera module;
wherein the second control section outputs first information which includes original verifying information which verifies the authenticity of the image data to the first control section through the electrical signal lines, wherein the first information includes image capturing information for capturing the image which is inherent in the main unit; and
the first control section superposes both the first information outputted from the second control section and the second information obtained by the camera module, onto the image data, wherein the second information includes information for capturing the image which is inherent in the camera module.

9. The image capturing device of claim 8, wherein the first control section produces total information for capturing the image by the image capturing section, based on the information for capturing the image which is inherent in the main unit included in the first information, and also based on the information for capturing the image which is inherent in the camera module included in the second information, and further the first control section superposes the total information for capturing the image onto the image data via a predetermined format.

10. The image capturing device of claim 8, wherein the original verifying information is interpolation detecting information which detects interpolation of the image data.

11. The image capturing device of claim 8, wherein the original verifying information is digital signature information which shows an author of the original image data.

12. The image capturing device of claim 8, wherein the original verifying information is time information which shows a precise time when the image data was captured.

13. The image capturing device of claim 8, wherein the main unit further includes an obtaining section which obtains the original verifying information from a third organization.

14. The image capturing device of claim 8, wherein the first control section superposes the original verifying information, included in the first information, onto signals of the image data as a digital watermark.

15. The image capturing device of claim 8, wherein the first control section produces total information for capturing the image by the image capturing section, based on the information for capturing the image which is inherent in the main unit included in the first information, and also based on the information for capturing the image which is inherent in the camera module included in the second information, and further the first control section superposes the total information for capturing the image on the image data via a predetermined format.

16. The image capturing device of claim 8, wherein the main unit further includes an input section which selects and determines whether to include the original verifying information in the first information.

* * * * *